(12) United States Patent
Shimazaki

(10) Patent No.: US 8,861,854 B2
(45) Date of Patent: Oct. 14, 2014

(54) CHARACTER RECOGNITION APPARATUS, METHOD, AND COMPUTER-READABLE, NON-TRANSITORY MEDIUM

(71) Applicant: PFU Limited, Kahoku (JP)

(72) Inventor: Katsuhito Shimazaki, Kahoku (JP)

(73) Assignee: PFU Limited, Kahoku-shi (JP)

(*) Notice: Subject to any disclaimer, the term of this patent is extended or adjusted under 35 U.S.C. 154(b) by 0 days.

(21) Appl. No.: 13/714,279

(22) Filed: Dec. 13, 2012

(65) Prior Publication Data

US 2013/0243321 A1    Sep. 19, 2013

(30) Foreign Application Priority Data

Mar. 19, 2012 (JP) .................................. 2012-062731

(51) Int. Cl.
*G06K 9/00* (2006.01)
*G06K 9/46* (2006.01)
*G06K 9/38* (2006.01)
*G06K 9/34* (2006.01)

(52) U.S. Cl.
CPC ..... *G06K 9/46* (2013.01); *G06K 9/38* (2013.01)
USPC .......................................... 382/170; 382/181

(58) Field of Classification Search
USPC .......... 382/162, 164, 168, 170, 171, 173, 176, 382/181, 182; 348/175, E17.002
See application file for complete search history.

(56) References Cited

U.S. PATENT DOCUMENTS

| 4,053,737 | A | * | 10/1977 | Lafevers et al. ............... 235/449 |
| 2005/0201620 | A1 | * | 9/2005 | Kanamoto et al. ............. 382/182 |
| 2010/0111416 | A1 | * | 5/2010 | Meiers ............................ 382/170 |
| 2010/0295948 | A1 | * | 11/2010 | Xie et al. ........................ 348/175 |
| 2011/0222121 | A1 |   | 9/2011 | Odamaki |
| 2013/0243321 | A1 | * | 9/2013 | Shimazaki .................... 382/170 |

FOREIGN PATENT DOCUMENTS

| JP | 8-315159 | 11/1996 |
| JP | 2011-191903 | 9/2011 |

* cited by examiner

*Primary Examiner* — Amir Alavi
(74) *Attorney, Agent, or Firm* — Christie, Parker & Hale, LLP

(57) ABSTRACT

There are provided an image processing apparatus, a character recognition method and a computer-readable, non-transitory medium that can perform character recognition at high speed while retaining character recognition accuracy. The image processing apparatus includes a histogram generator for generating a histogram based on a pixel value of each pixel in an input image, a component judging unit for judging whether the input image contains a character component and whether the input image contains the character component and a non-character component, a binarization unit for producing a binary image based on edge strength of each pixel, when the input image contains both the character component and the non-character component, and for producing a binary image based on a luminance value of each pixel, when the input image contains the character component but does not contain the non-character component, and a character recognition unit for performing character recognition on the binary image.

7 Claims, 12 Drawing Sheets

CHARACTER RECOGNITION APPARATUS, METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2012-062731, filed on Mar. 19, 2012, the entire contents of which are incorporated herein by reference.

TECHNICAL FIELD

Embodiments discussed in the present specification relate to image processing technology.

BACKGROUND

OCR (Optical Character Recognition) is a technology that acquires image data by reading a document using a scanner or the like and recognizes characters by processing the acquired image data. In OCR, it is necessary to recognize characters not only from a document containing only characters but also from a document containing a mixture of characters, pictures, photographs, etc. Due to the need to recognize characters with high accuracy from various kinds of documents, the OCR process is becoming complex and takes a long time to accomplish.

Japanese Laid-open Patent Publication No. 2011-191903 discloses an information processing apparatus comprising a CPU, a sequential processing unit, and a parallel processing unit. The information processing apparatus checks in advance, for each specific operation to be executed in image processing, as to which of the processing units, the CPU, the sequential processing unit, or the parallel processing unit, can perform the operation at the fastest speed, and prestores a table indicating which operation is to be assigned to which processing unit. Then, for each operation to be executed, the CPU refers to the prestored table and selects the processing unit to which the operation is to be assigned.

Japanese Laid-open Patent Publication No. 08-315159 discloses an image processing apparatus which performs processing for character recognition and processing for compression. The image processing apparatus divides a document containing a mixture of text, graphics, and pictures into a plurality of regions by recognizing the attributes of image data (title, text, graphics, and pictures). Then, character recognition is performed on the regions containing characters such as title and text, by using binary data obtained by simple binarization. In Japanese Laid-open Patent Publication No. 08-315159, it is described that, for the regions containing characters such as title and text, compression is applied to the binary data obtained by simple binarization, while for halftone regions such as pictures, photographs, etc., compression is applied to halftoned binary data binarized by an error diffusion method.

SUMMARY

The information processing apparatus disclosed in Japanese Laid-open Patent Publication No. 2011-191903 can perform each operation at high speed because the processing unit is selected so that the task at the fastest speed can be accomplished for each specific operation to be executed in image processing. However, when performing character recognition by using this information processing apparatus, since a predetermined sequence of operations is performed indiscriminately regardless of the kind of document to be processed, almost the same processing time as required to process a document containing a mixture of characters, pictures, photographs, etc., is required to process a document containing only characters.

On the other hand, the image processing apparatus disclosed in Japanese Laid-open Patent Publication No. 08-315159 can perform character recognition at high speed because character recognition is not performed on the regions of pictures, photographs, etc. However, if characters are contained in the regions of pictures, photographs, etc., the image processing apparatus is unable to recognize such characters.

It is an object of the present invention to provide an image processing apparatus and a character recognition method that can perform character recognition at high speed while retaining character recognition accuracy, and a computer-readable, non-transitory medium storing a computer program for causing a computer to implement such a character recognition method.

According to an aspect of the apparatus, there is provided an image processing apparatus. The image processing apparatus includes a histogram generator for generating a histogram based on a pixel value of each pixel in an input image, a component judging unit for judging whether the input image contains a character component and whether the input image contains, in addition to the character component, a non-character component other than a background component, based on the histogram, a binarization unit for producing a binary image in accordance with a first process that binarizes the input image based on edge strength of each pixel, when the input image contains both the character component and the non-character component, and for producing a binary image in accordance with a second process that binarizes the input image based on a luminance value of each pixel, when the input image contains the character component but does not contain the non-character component, and a character recognition unit for performing character recognition on the binary image.

According to an aspect of the method, there is provided a character recognition method. The character recognition method includes generating a histogram based on a pixel value of each pixel in an input image, judging whether the input image contains a character component and whether the input image contains, in addition to the character component, a non-character component other than a background component, based on the histogram, producing a binary image in accordance with a first process that binarizes the input image based on edge strength of each pixel when the input image contains both the character component and the non-character component, and producing a binary image in accordance with a second process that binarizes the input image based on a luminance value of each pixel when the input image contains the character component but does not contain the non-character component, and performing, using a computer, character recognition on the binary image.

According to an aspect of the computer-readable, non-transitory medium storing a computer program, the computer program causes a computer to execute a process, including generating a histogram based on a pixel value of each pixel in an input image, judging whether the input image contains a character component and whether the input image contains, in addition to the character component, a non-character component other than a background component, based on the histogram, producing a binary image in accordance with a first process that binarizes the input image based on edge strength of each pixel when the input image contains both the character component and the non-character component, and producing a binary image in accordance with a second process that binarizes the input image based on a luminance value of each pixel when the input image contains the character component but does not contain the non-character component, and performing character recognition on the binary image.

According to the image processing apparatus and the character recognition method, and the computer-readable, non-transitory medium, it is possible to perform character recognition at high speed while retaining character recognition accuracy.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

An image processing apparatus, a character recognition method, and a computer program will be described below with reference to the drawings. It will, however, be noted that the technical scope of the invention is not limited to the specific embodiments described herein but extends to the inventions described in the appended claims and their equivalents.

Figure 1:
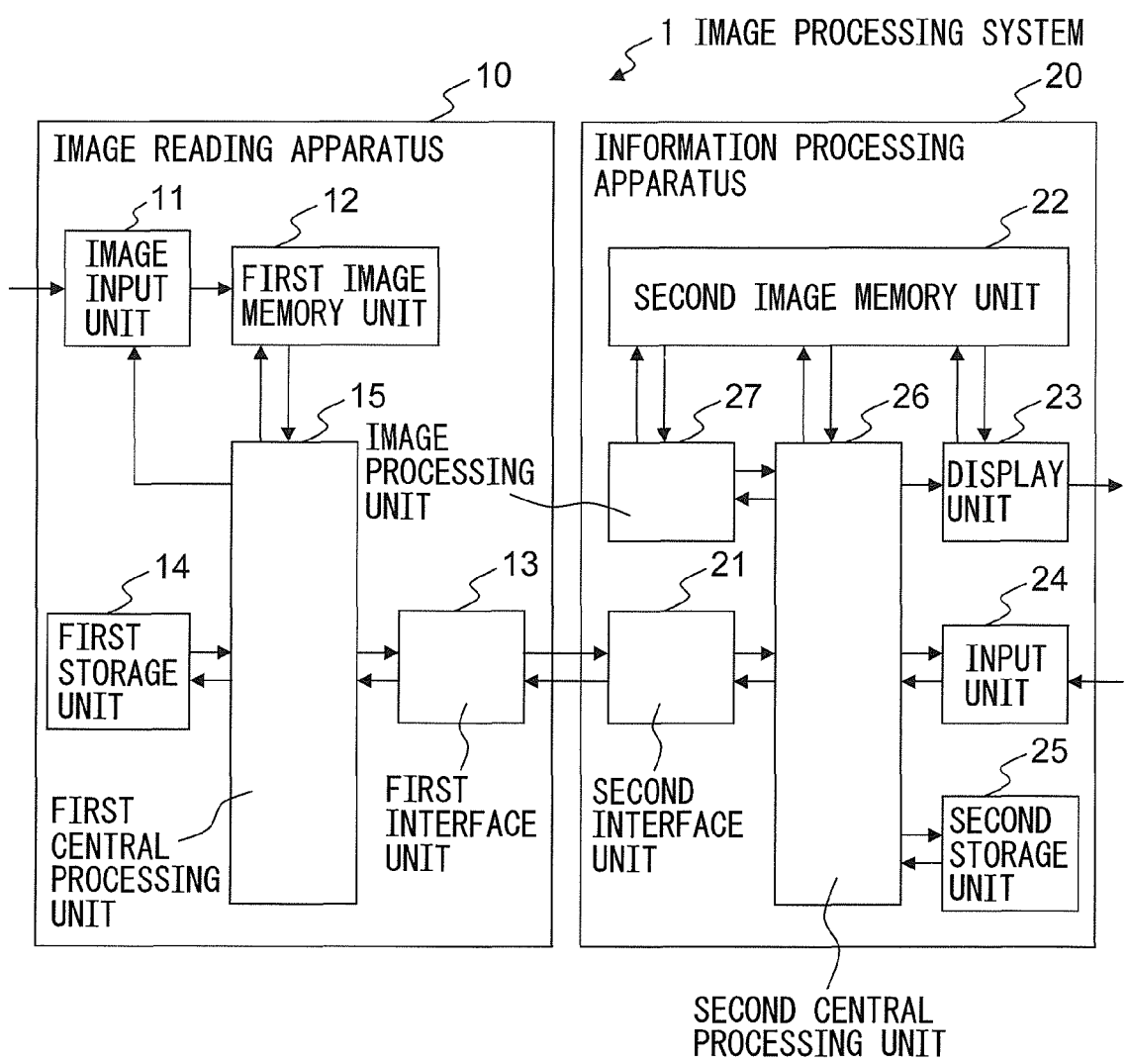
FIG. 1 is a diagram schematically illustrating the configuration of an image processing system.

FIG. 1 is a diagram schematically illustrating the configuration of an image processing system. As illustrated in FIG. 1, the image processing system 1 includes an image reading apparatus 10 and an information processing apparatus 20. The image reading apparatus 10 is, for example, an image scanner, a digital camera, or the like, while the information processing apparatus 20 is, for example, a personal computer or the like which is connected to the image reading apparatus 10 for use.

The image reading apparatus 10 includes an image input unit 11, a first image memory unit 12, a first interface unit 13, a first storage unit 14, and a first central processing unit 15. The various units constituting the image reading apparatus 10 will be described in detail below.

The image input unit 11 includes an image sensor for capturing an image of a subject such as a document or the like. The image sensor includes imaging devices, such as CCDs (Charged Coupled Devices) or CMOS (Complementary Metal Oxide Semiconductor) devices, arranged in a one-dimensional or two-dimensional array, and optics for focusing the image of the subject onto the imaging devices. Each imaging device outputs an analog value corresponding to each RGB color. The image input unit 11 generates pixel data by converting each of the analog values output from the image sensor into a digital value, and generates image data (hereinafter called the input image) made up of the pixel data. The input image provides color image data represented, for example, by a total of 24 bits of RGB values with each pixel data represented by 8 bits for each RGB color.

The first image memory unit 12 includes a storage device such as a nonvolatile semiconductor memory, a volatile semiconductor memory, a magnetic disk, or the like. The first image memory unit 12 is connected to the image input unit 11 and stores the input image generated by the image input unit 11.

The first interface unit 13 includes an interface circuit conforming to a serial bus architecture such as USB (Universal Serial Bus), and is electrically connected to the information processing apparatus 20 for transmission and reception of image data and various kinds of information. Further, a flash memory or the like may be connected to the first interface unit 13 so that the image data stored in the first image memory unit 12 may be temporarily stored in the flash memory and transferred to the information processing apparatus 20. Alternatively, the first interface unit 13 may be connected to the information processing apparatus 20 via a wired or wireless network, such as the Internet, a telephone network (including a mobile telephone network or a public switched telephone network), or an intranet. In that case, the first interface unit 13 is equipped with a communication interface circuit for connection to the network.

The first storage unit 14 includes a memory device such as a RAM (Random Access Memory) or ROM (Read Only Memory), a fixed disk device such as a hard disk, or a removable storage device such as a flexible disk or an optical disk. The first storage unit 14 stores a computer program, data base, table, etc., which are used by the image reading apparatus 10 to perform various processing operations. The computer program may be installed on the first storage unit 14 from a computer-readable, non-transitory medium such as a compact disk read only memory (CD-ROM), a digital versatile disk read only memory (DVD-ROM), or the like by using a well-known setup program or the like.

The first central processing unit 15 is connected to the image input unit 11, the first image memory unit 12, the first interface unit 13, and the first storage unit 14, and controls these units. The first central processing unit 15 performs control operations such as the image generation control of the image input unit 11, the control of the first image memory unit 12, the control of data transmission and reception to and from the information processing apparatus 20 via the first interface unit 13, and the control of the first storage unit 14.

The information processing apparatus 20 includes a second interface unit 21, a second image memory unit 22, a display unit 23, an input unit 24, a second storage unit 25, a second central processing unit 26, and an image processing unit 27. The various units constituting the information processing apparatus 20 will be described in detail below.

The second interface unit 21 includes an interface circuit similar to the one constituting the first interface unit 13 of the image reading apparatus 10, and connects the information processing apparatus 20 to the image reading apparatus 10.

The second image memory unit 22 includes a storage device similar to the one constituting the first image memory unit 12 of the image reading apparatus 10. The second image memory unit 22 stores the image data received from the image reading apparatus 10 via the second interface unit 21; the second image memory unit 22 is also connected to the image processing unit 27, and stores various kinds of processed images that the image processing unit 27 produced by applying image processing operations to the input image.

The display unit 23 includes a display, such as a liquid crystal display or an organic EL display, and an interface circuit which outputs image data or various kinds of information to the display; the display unit 23 is connected to the second image memory unit 22 and the second central processing unit 26, and displays image data retrieved from the second image memory unit 22 or information output from the second central processing unit 26.

The input unit 24 includes an input device, such as a keyboard or a mouse, and an interface circuit which acquires a signal from the input device; the input unit 24 outputs a signal responsive to a user operation performed thereon and supplies the signal to the second central processing unit 26.

The second storage unit 25, similarly to the first storage unit 14 in the image reading apparatus 10, is constructed from a memory device, a fixed disk device, a portable storage device, or the like. The second storage unit 25 stores a computer program, data base, table, etc., which are used by the information processing apparatus 20 to perform various processing operations. The computer program may be installed on the second storage unit 25 from a computer-readable, non-transitory medium such as a compact disk read only memory (CD-ROM), a digital versatile disk read only memory (DVD-ROM), or the like by using a well-known setup program or the like.

The second central processing unit 26 is connected to the second interface unit 21, the second image memory unit 22, the display unit 23, the input unit 24, the second storage unit 25, and the image processing unit 27, and controls these units. The second central processing unit 26 performs control operations such as the control of data transmission and reception to and from the image reading apparatus 10 via the second interface unit 21, the control of the second image memory unit 22, the display control of the display unit 23, the input control of the input unit 24, the control of the second storage unit 25, and the image processing control of the image processing unit 16.

The image processing unit 27 is connected to the second image memory unit 22, and performs processing for character recognition. The image processing unit 27 is connected to the second central processing unit 26 and performs processing operations under the control of the second central processing unit 26 in accordance with the program prestored in the second storage unit 25. The image processing unit 27 may be implemented as an independent integrated circuit, microprocessor, firmware, or the like.

Figure 2:
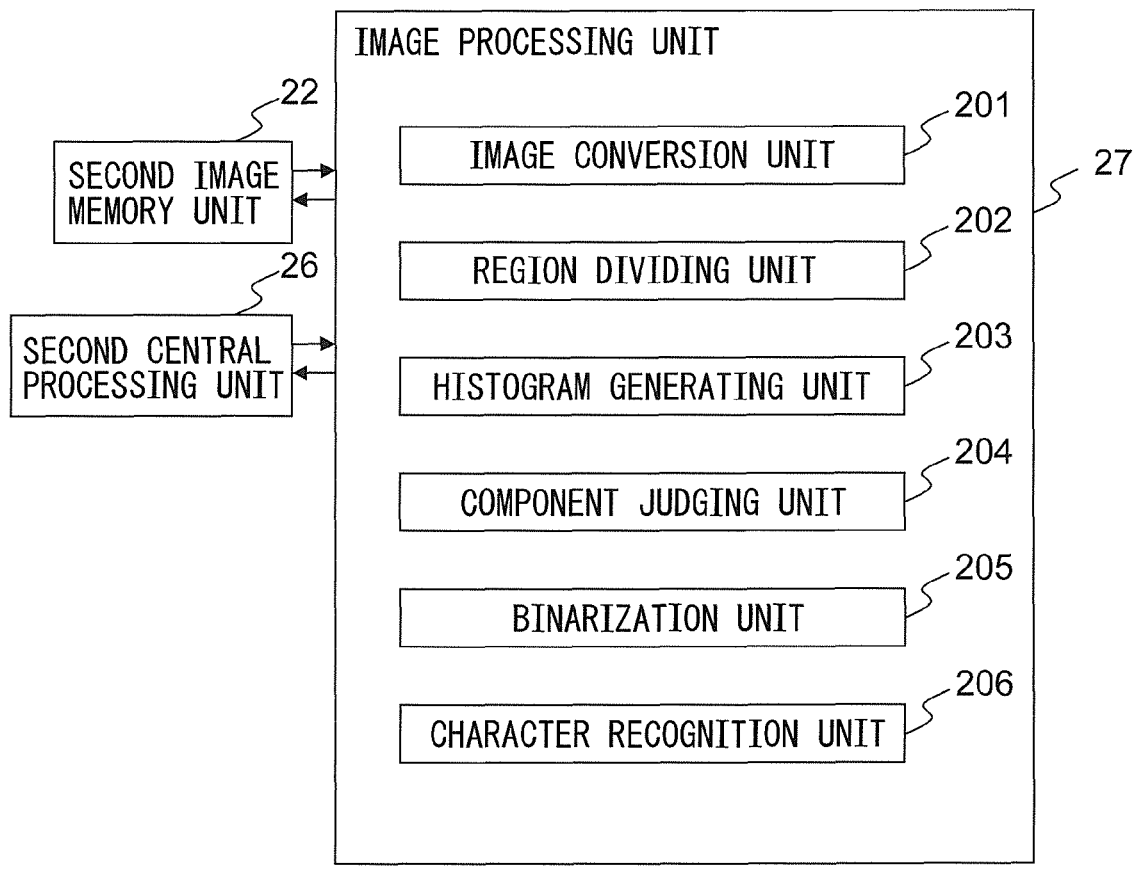
FIG. 2 is a diagram schematically illustrating the configuration of an image processing unit.

FIG. 2 is a diagram schematically illustrating the configuration of the image processing unit 27. As illustrated in FIG. 2, the image processing unit 27 includes an image conversion unit 201, a region dividing unit 202, a histogram generating unit 203, a component judging unit 204, a binarization unit 205, and a character recognition unit 206. These units are functional modules implemented by software executed on a processor. Alternatively, these units may each be implemented as an independent integrated circuit, microprocessor, firmware, or the like.

Figure 3:
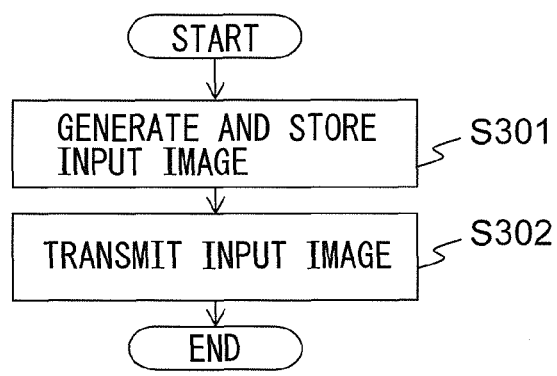
FIG. 3 is a flowchart illustrating one example of the sequence of operations of an image reading process.

FIG. 3 is a flowchart illustrating one example of the sequence of operations of the image reading process performed by the image reading apparatus 10. The sequence of operations of the image reading process will be described below with reference to the flowchart of FIG. 3. The operation flow described hereinafter is executed primarily by the first central processing unit 15 in collaboration with the various component elements of the image reading apparatus 10 in accordance with the program prestored in the first storage unit 14.

First, the image input unit 11 generates an input image by capturing an image of the subject which is a document, and stores the input image in the first image memory unit 12 (step S301).

Next, the first central processing unit 15 retrieves the input image stored in the first image memory unit 12, and transmits it via the first interface unit 13 to the information processing apparatus 20 (step S302), thus terminating the series of steps.

Figure 4:
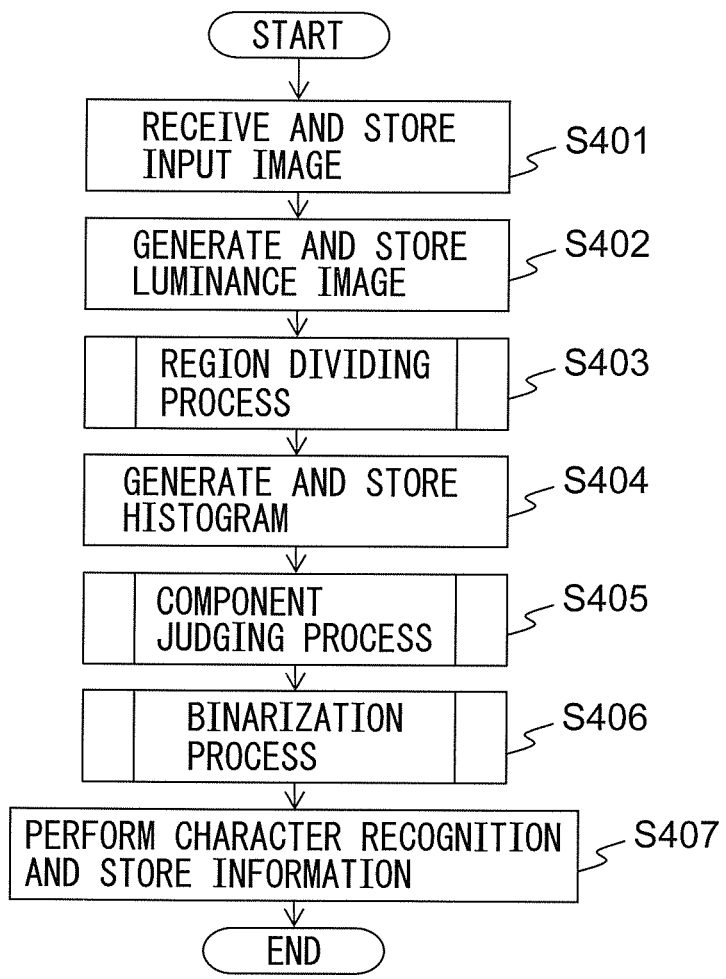
FIG. 4 is a flowchart illustrating one example of the sequence of operations of a character recognition process.

FIG. 4 is a flowchart illustrating one example of the sequence of operations of the character recognition process performed by the image processing apparatus 20. The sequence of operations of the character recognition process will be described below with reference to the flowchart of FIG. 4. The operation flow described hereinafter is executed primarily by the second central processing unit 26 in collaboration with the various component elements of the information processing apparatus 20 in accordance with the program prestored in the second storage unit 25.

First, the second central processing unit 26 receives the input image from the image reading apparatus 10 via the second interface unit 21, and stores the input image in the second image memory unit 22 (step S401).

Next, the image conversion unit 201 retrieves the input image stored in the second image memory unit 22, generates an image (hereinafter called the luminance image) by converting the RGB value of each pixel in the input image into a luminance value, and stores the luminance image in the second image memory unit 22 (step S402). The luminance value can be calculated, for example, from the following equation.

$$\text{Luminance value} = 0.30 \times R \text{ value} + 0.59 \times G \text{ value} + 0.11 \times B \text{ value} \quad (1)$$

Next, the region dividing unit 202 performs processing to divide the input image into image regions one separated from another by a region formed by connecting pixels each having a luminance value which is a predetermined width (step S403).

Figure 5:
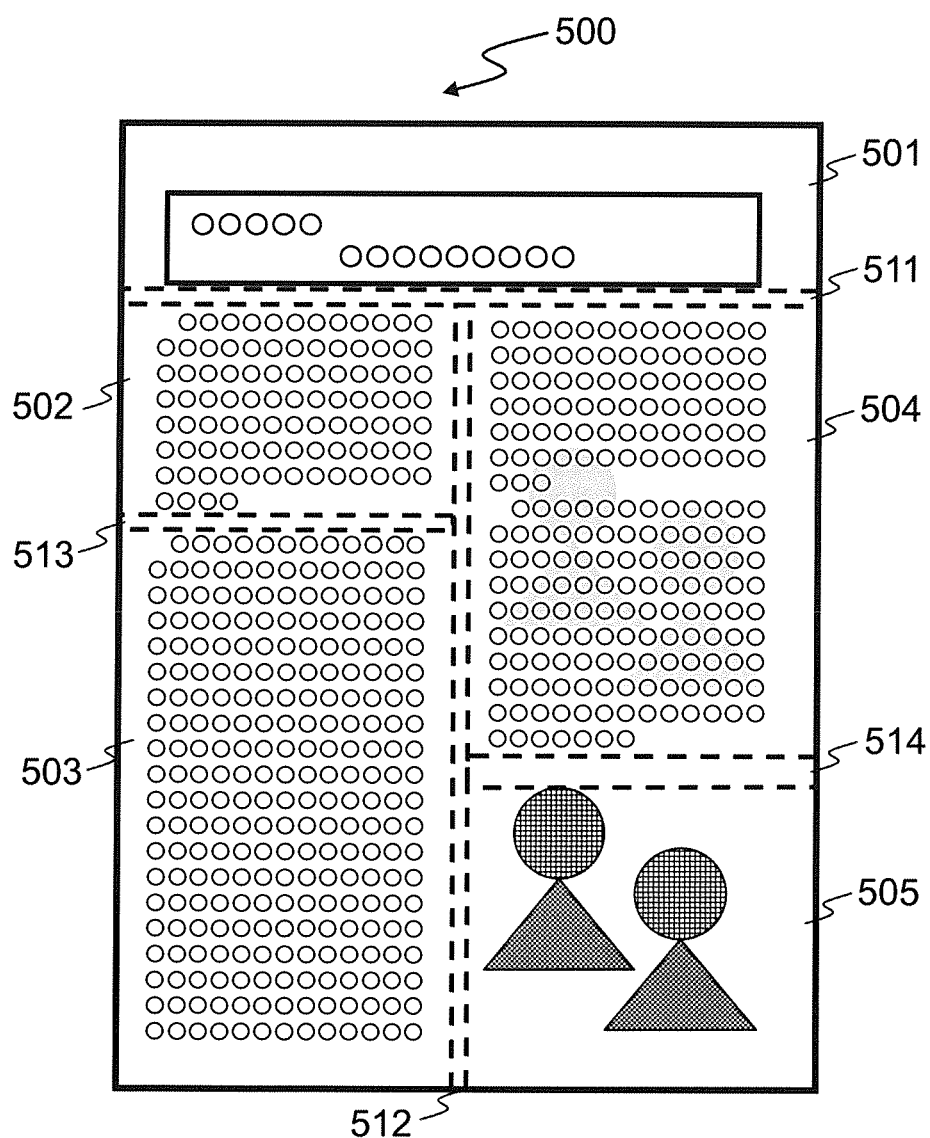
FIG. 5 is a schematic diagram for explaining a region dividing process.

FIG. 5 is a schematic diagram for explaining the region dividing process. The image 500 shown in FIG. 5 is an example of the input image. The input image 500 comprises a title region 501, text regions 502 and 503, a text/picture mixed region 504, and a picture region 505. The region dividing unit 202 extracts blank regions 511 to 514 each formed by connecting pixels each having a luminance value which is a predetermined width (for example, 10), and divides the input image 500 into the respective regions 501 to 505 by interposing the extracted blank regions 511 to 514 therebetween.

Figure 6:
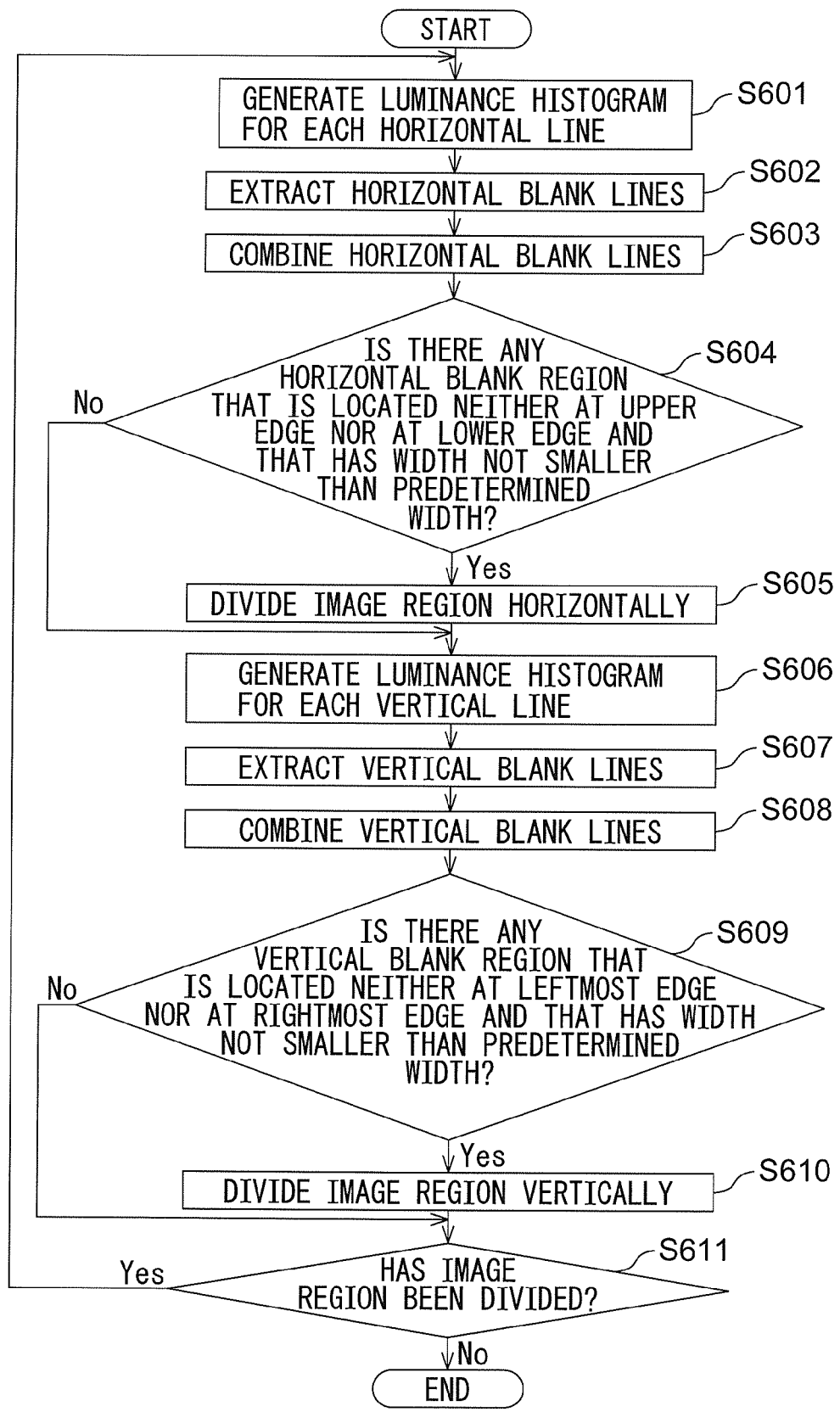
FIG. 6 is a flowchart illustrating one example of the sequence of operations of the region dividing process.

FIG. 6 is a flowchart illustrating one example of the sequence of operations of the region dividing process. The sequence of operations of the region dividing process will be described below with reference to the flowchart of FIG. 6.

The region dividing unit 202 retrieves the luminance image from the second image memory unit 22, and generates a histogram of the luminance values of pixels (hereinafter called the luminance histogram) for each horizontal line in the luminance image (step S601).

Next, based on the luminance histogram, the region dividing unit 202 extracts any horizontal line made up of pixels each of whose luminance values which is a predetermined width, and designates such a horizontal line as a horizontal blank line (step S602). Alternatively, if the ratio (in percent) of the number of pixels each of whose luminance values which is a predetermined width to the total number of pixels constituting the horizontal line is not smaller than a predetermined percentage (for example, 95%), then the horizontal line may be designated as a horizontal blank line.

Next, the region dividing unit 202 forms a horizontal blank region by combining adjacent horizontal blank lines whose pixel luminance values are distributed over substantially the same range (step S603).

Then, the region dividing unit 202 checks to determine whether there is any horizontal blank region that is located neither at the upper edge nor at the lower edge of the luminance image and that has a width not smaller than a predetermined width (for example, two lines) (that is, a horizontal blank region formed by combining at least a predetermined number of horizontal blank lines) (step S604).

If there is such a horizontal blank region, the region dividing unit 202 divides the input image horizontally into a plurality of regions along the region in the input image that corresponds to the horizontal blank region (step S605). In the example shown in FIG. 5, the input image 500 is divided horizontally along the blank region 511 into two regions, one being the title region 501 and the other the image region below the blank region 511. On the other hand, if there is no such horizontal blank region, the region dividing unit 202 does nothing and proceeds to step S606.

Next, the region dividing unit 202 generates a luminance histogram for each vertical line in each of the regions in the luminance image that correspond to the image regions formed by dividing the luminance image (if the luminance image is not divided in step S605, then for each vertical line in the luminance image) (step S606).

Next, based on the luminance histogram, the region dividing unit 202 extracts any vertical line made up of pixels each of whose luminance values is a predetermined width, and designates such a vertical line as a vertical blank line (step S607). As in step S602, if the ratio (in percent) of the number of pixels each of whose luminance values is a predetermined width to the total number of pixels constituting the vertical line is not smaller than a predetermined percentage, then the vertical line may be designated as a vertical blank line.

Next, the region dividing unit 202 forms a vertical blank region by combining adjacent vertical blank lines whose pixel luminance values are distributed over substantially the same range (step S608).

Then, the region dividing unit 202 checks to determine whether there is any vertical blank region that is located neither at the leftmost edge nor at the rightmost edge of the luminance image and that has a width not smaller than a predetermined width (i.e., a vertical blank region formed by combining at least a predetermined number of vertical blank lines) (step S609).

If there is such a vertical blank region, the region dividing unit 202 divides each image region vertically into a plurality of regions along the region in the input image that corresponds to the vertical blank region (step S610). In the example shown in FIG. 5, the title region 501 is not divided, while on the other hand, the image region below the blank region 511 is divided vertically along the blank region 512 into two regions, one to the left and the other to the right of the blank region 512. On the other hand, if there is no such blank region, the region dividing unit 202 does nothing and proceeds to step S611.

In the next step (step S611), the region dividing unit 202 determines whether any image region has been divided in step S610. If any image region has been divided in step S610, the region dividing unit 202 repeats the process from step S601 to step S610 for each of the image regions thus divided. On the other hand, if no image region has been divided in step S610, the series of steps is terminated.

In each of the second and subsequent cycles of steps S601 to S610, the region dividing unit 202 determines after step S605 whether any image region has been divided in step S605, and if no image region has been divided, the series of steps is terminated.

In the example shown in FIG. 5, in the second cycle of the horizontally dividing process, the image region to the left of the blank region 512 is divided horizontally along the blank region 513 into the text regions 502 and 503, and the image region to the right of the blank region 512 is divided horizontally along the blank region 514 into the mixed region 504 and the picture region 505. Then, in the second cycle of the vertically dividing process, since no blank region is extracted, the region dividing process is terminated.

In this way, the region dividing unit 202 divides the input image into regions at high speed by using the luminance histogram generated for each horizontal line or vertical line.

Alternatively, the region dividing unit 202 may generate a decimated image by decimating pixels in the luminance image horizontally and vertically, and may perform the region dividing process by using the decimated image. In this case, the region dividing unit 202 can perform the region dividing process at a higher speed.

Further, the region dividing unit 202 may generate a binary image by binarizing each pixel in the luminance image by using a threshold value T1, and may perform the region dividing process by using the binary image. The threshold value T1 here may be set, for example, equal to the average luminance value of all the pixels contained in the luminance image. In that case, the region dividing unit 202 assigns a binary 0 to any pixel whose luminance value is not smaller than the threshold value T1 (a lighter pixel) and a binary 1 to any pixel whose luminance value is smaller than the threshold value T1 (a darker pixel). Then, the sum of the binary values is calculated for each line in the binary image, and any line for which the sum is not larger than a predetermined value (for example, 5) is designated as a blank line. In this way, the region dividing unit 202 can perform the region dividing process at a higher speed.

Turning back to FIG. 4, the histogram generating unit 203 generates a histogram of the luminance values of pixels for each image region formed by dividing the luminance image by the region dividing unit 202, and stores the histogram in the second image memory unit 22 (step S404).

Next, based on the histogram generated by the histogram generating unit 203, the component judging unit 204 performs the component judging process for judging whether each specific image region contains character components and whether the image region contains the non-character components which are other than the character components and the background components (step S405).

Figure 7A:
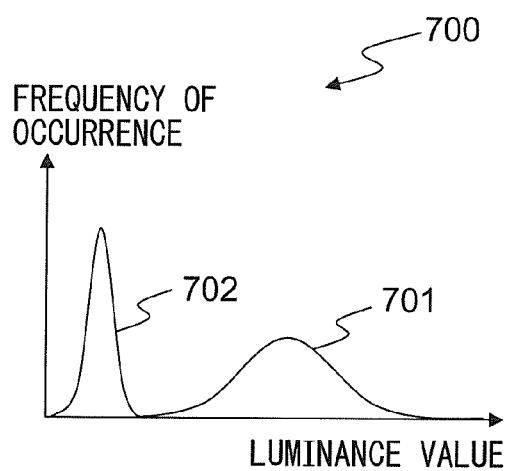
FIG. 7A is a schematic diagram for explaining a component judging process.
Figure 7B:
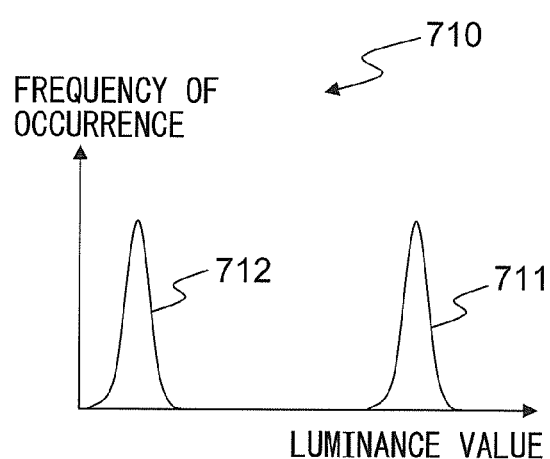
FIG. 7B is a schematic diagram for explaining a component judging process.
Figure 7C:
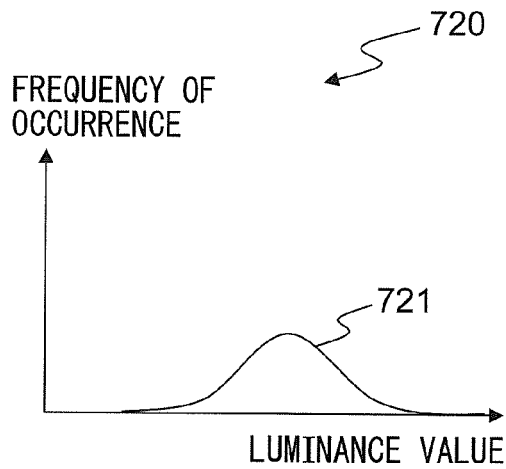
FIG. 7C is a schematic diagram for explaining a component judging process.

FIGS. 7A to 7C are schematic diagrams for explaining the component judging process. Graph 700 of FIG. 7A shows an example of a histogram of the luminance values in an image region that contains both character components and non-character components, graph 710 of FIG. 7B shows an example of a histogram of luminance values in an image region that contain character components but does not contain non-character components, and graph 720 of FIG. 7C shows an example of a histogram of the luminance values in an image region that contain non-character components but does not contain character components. In each of the graphs 700, 710, and 720, the abscissa represents the luminance value, and the ordinate represents the frequency of occurrence.

In an ordinary document, the lightness of the characters and the lightness of the background are uniform within their respective areas, but differ greatly from each other so that the viewer can clearly distinguish the characters from the background. On the other hand, a picture, photograph, or the like is not uniform in lightness. As a result, in the histogram of luminance values, the character components and the background components tend to be distributed within a narrow range, while the non-character components tend to be distributed over a wide range. Further, in an ordinary document, when characters are superimposed on a picture, photograph, or the like, the lightness of the characters is made different from the lightness of the picture, photograph, or the like so that the viewer can distinguish the characters from the picture, photograph, or the like. Accordingly, as shown in FIG. 7A, in the case of a histogram of the luminance values in an image region that contains both character components and non-character components, it is highly likely that the histogram contains both a wide distribution range 701 due to the non-character components and a narrow distribution range 702 due to the character components. Further, as shown in FIG. 7B, in the case of a histogram of the luminance values in an image region that contains character components but does not contain non-character components, it is highly likely that the histogram contains a narrow distribution range 711 due to the background components and a narrow distribution range 712 due to the character components. On the other hand, as shown in FIG. 7C, in the case of a histogram of the luminance values in an image region that contains non-character components but does not contain character components, it is highly likely that the histogram contains only a wide distribution range 721 due to the non-character components. In view of this, the component judging unit 204 judges, based on these features, whether each specific image region contains character components and/or non-character components.

Figure 8:
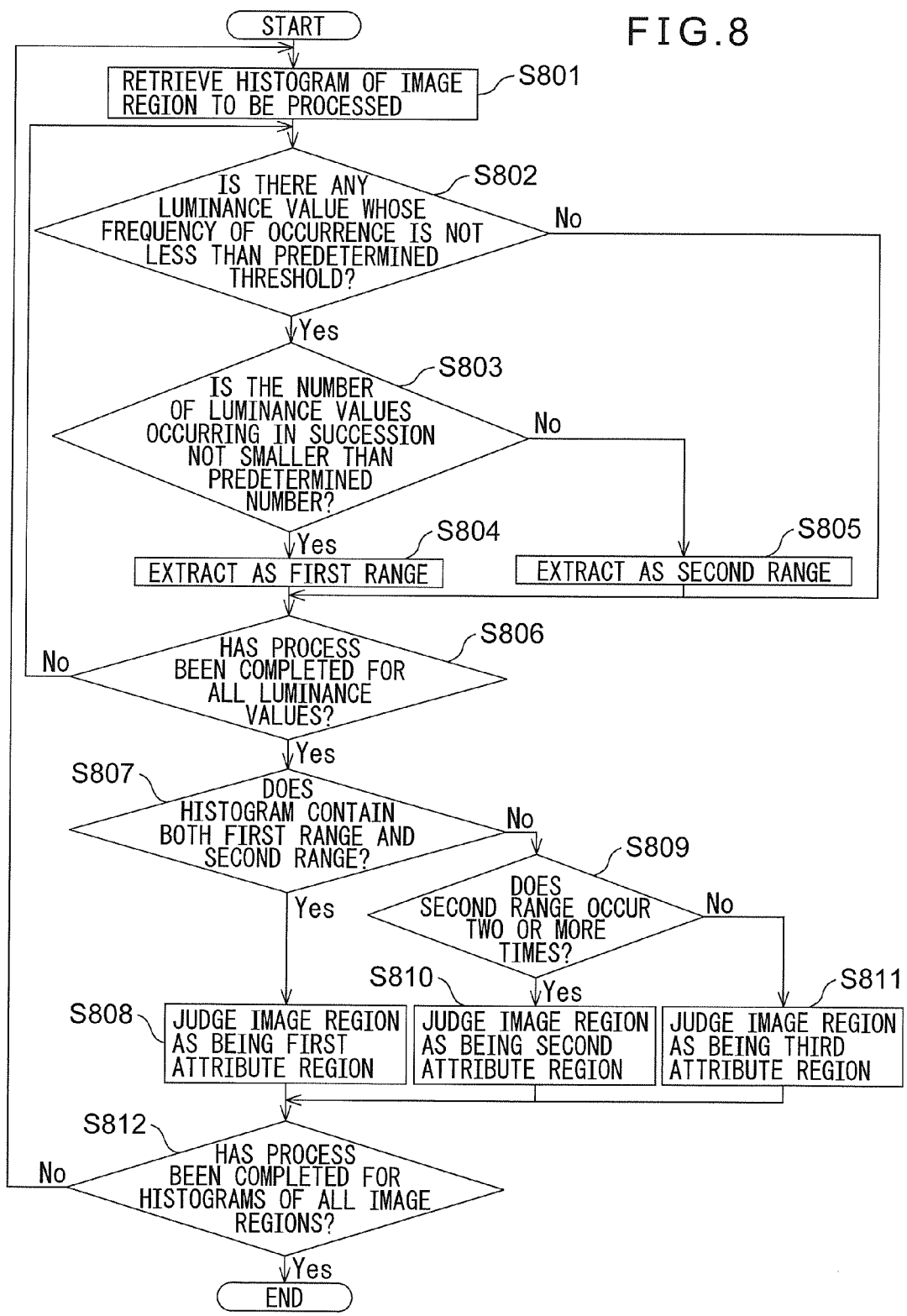
FIG. 8 is a flowchart illustrating one example of the sequence of operations of the component judging process.

FIG. 8 is a flowchart illustrating one example of the sequence of operations of the component judging process. The sequence of operations of the component judging process will be described below with reference to the flowchart of FIG. 8.

The component judging unit 204 retrieves from the second image memory 22 the luminance histogram of the image region to be processed (step S801).

Next, the component judging unit 204 examines the retrieved histogram in sequence starting from the lowest luminance value to determine whether there is any luminance value whose frequency of occurrence is not less than a predetermined percentage (for example, 1%) of the total number of pixels contained in the image region (step S802).

If there is no such luminance value, the component judging unit 204 proceeds to step S806; on the other hand, if there is such a luminance value, the component judging unit 204 determines whether the number of such luminance values occurring in succession is not smaller than a predetermined number (for example, 20) (step S803).

If the number of such luminance values occurring in succession is not smaller than the predetermined number, the range over which such luminance values occur in succession is extracted as a first range (step S804), and if the number is smaller than the predetermined number, the range over which such luminance values occur in succession is extracted as a second range (step S805).

Next, the component judging unit 204 determines whether the above process has been completed for all the luminance values in the histogram (step S806). If the above process has not yet been completed for all the luminance values, the component judging unit 204 returns to step S802 to repeat the process of steps S802 to S805 until the process is completed for all the luminance values.

When the process has been completed for all the luminance values, the component judging unit 204 judges whether the histogram contains both the first range and the second range (step S807). If the histogram contains both the first range and the second range, the component judging unit 204 judges the image region as being a first attribute region that contains both character components and non-character components (step S808). When the histogram contains both the first range and the second range, the component judging unit 204 judges the image region as being the first attribute region even if either one or both of these ranges occur two or more times in the histogram, because, in this case also, it is highly likely that the image region contains both character components and non-character components.

On the other hand, if the histogram does not contain both the first range and the second range, the component judging unit 204 judges whether the second range occurs two or more times (step S809). If the second range occurs two or more times, the component judging unit 204 judges the image region as being a second attribute region that contains only character components and background components (step S810). If the second range occurs three or more times, it is highly likely that one such occurrence is due to the background components and the others due to character components that differ in lightness; therefore, in this case also, the component judging unit 204 judges the image region as being the second attribute region. However, in this case, the component judging unit 204 may judge one such occurrence as being due to non-character components and may determine that the image region is the first attribute region.

On the other hand, if the second range does not occur two or more times, the component judging unit 204 judges the image region as being a third attribute region that does not contain any character components (step S811). If the histogram contains only the first range, it is highly likely that the image region contains only non-character components, and if the histogram contains only the second range occurring only once, it is highly likely that the image region contains only the background components; in either case, the image region does not contain any character components.

When the attribute of the image region is thus determined, the component judging unit 204 determines whether the process has been completed for the histograms of all the image regions (step S812). If the process has not yet been completed for the histogram of all the image regions, the component judging unit 204 returns to step S801 to repeat the process of steps S801 to S811 until the process is completed for the histograms of all the image regions. When the process has been completed for the histograms of all the image regions, the component judging unit 204 terminates the series of steps.

In this way, by using the histogram of each image region, the component judging unit 204 can judge at high speed whether each specific image region contains character components and/or non-character components.

Turning back to FIG. 4, the binarization unit 205 performs binarization on each image region in accordance with the result of the judgment made by the component judging unit 204 (step S406).

Figure 9:
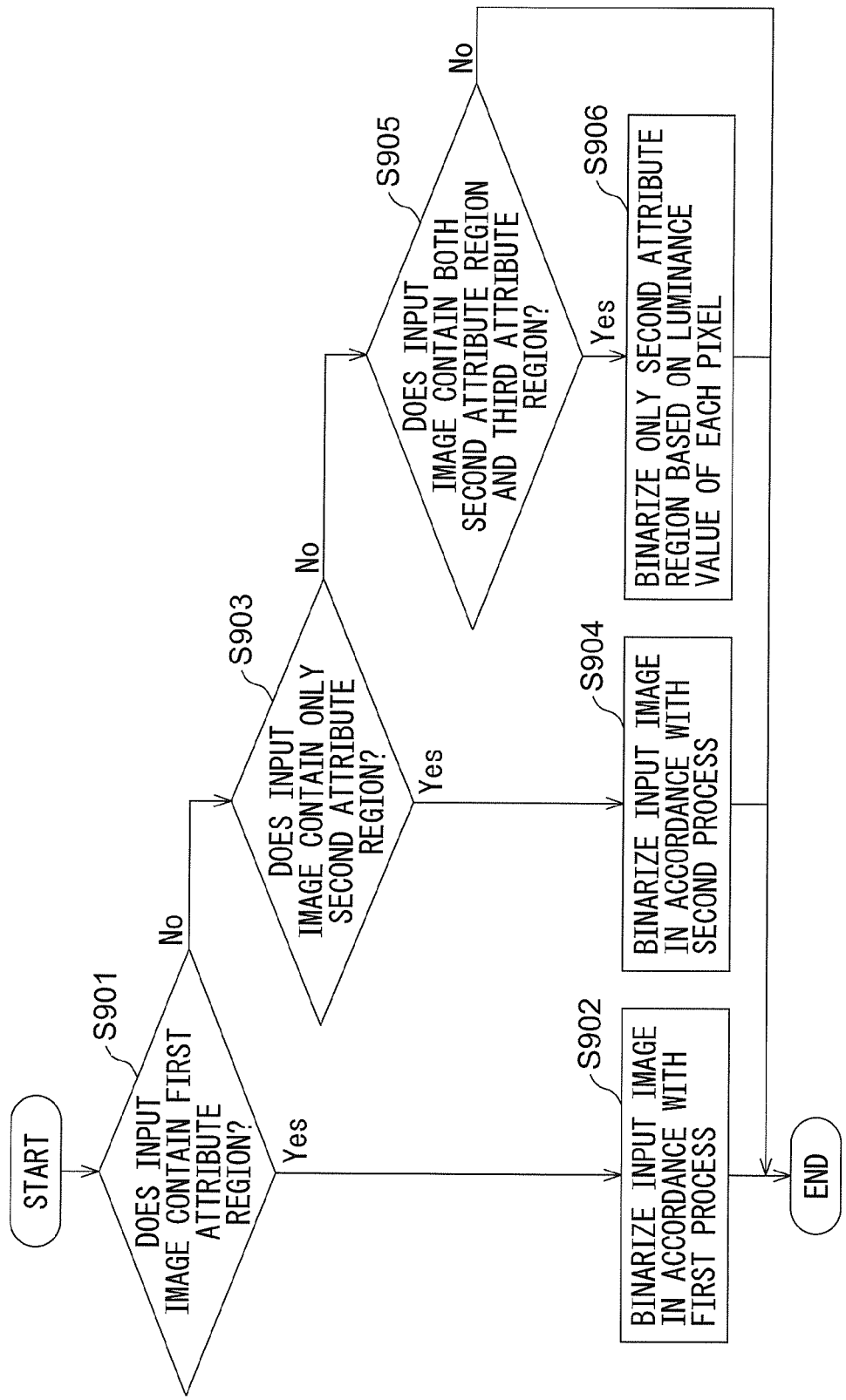
FIG. 9 is a flowchart illustrating one example of the sequence of operations of a binarization process.

FIG. 9 is a flowchart illustrating one example of the sequence of operations of the binarization process. The sequence of operations of the binarization process will be described below with reference to the flowchart of FIG. 9.

The binarization unit 205 determines whether the input image contains any first attribute region (step S901). If the input image contains any first attribute region, i.e., if the input image contains both character components and non-character components, and if at least one of the image regions contains both character components and non-character components, the binarization unit 205 binarizes the input image in accordance with a first process (step S902).

The image regions are the regions into which the input image has been divided by interposing blank regions therebetween, and the first attribute region contains both character components and non-character components. As a result, in the first attribute region, it is highly likely that the character components and non-character components are connected together, and therefore characters are superimposed on a picture, photograph, or the like. In this case, the binarization must be performed so as to properly separate the character components from the non-character components of varying luminance.

Therefore, in the first process, the binarization unit 205 binarizes the input image based on the edge strength of each pixel. For example, the binarization unit 205 applies edge detection filtering such as Prewitt filtering or Sobel filtering to each pixel in the luminance image and generates an edge image by taking the absolute value of its output value as a pixel value. Then, the binarization unit 205 produces a binary image by binarizing each pixel in the edge image based on whether or not the pixel value of the pixel exceeds a predetermined threshold value T2. The threshold value T2 here may be set, for example, equal to the minimum difference in luminance (for example, to 20) with which the human eye can perceive a difference in luminance on an image.

On the other hand, if the input image does not contain any first attribute region, then the binarization unit 205 determines whether the input image contains only the second attribute region (step S903). If the input image contains only the second attribute region, i.e., if the input image contains character components but does not contain any non-character components, the binarization unit 205 binarizes the input image in accordance with a second process (step S904).

The second attribute region contains only character components and background components, and does not contain any non-character components. That is, since the input image contains only character components and background components, it is highly likely that the character components can be separated from the background components without having to binarize the input image based on the edge strength of each pixel.

Therefore, in the second process, the binarization unit 205 binarizes the input image based on the luminance value of each pixel. In this case, the binarization unit 205 produces a binary image by binarizing each pixel in the edge image based on whether or not the luminance value of the pixel exceeds a predetermined threshold value T3. The threshold value T3 here may be set, for example, equal to the average of the luminance values of all the pixels in the luminance image. In the second process, the binarization can be accomplished faster than in the first process, because there is no need to obtain the edge strength of each pixel.

On the other hand, if the input image contains any image region other than the second attribute region, then the binarization unit 205 determines whether the input image contains both the second attribute region and the third attribute region (step S905). If the input image contains both the second attribute region and the third attribute region, i.e., if the input image contains both character components and non-character components, but there is no image region that contains both character components and non-character components, the binarization unit 205 binarizes only the second attribute region in the input image based on the luminance value of each pixel (step S906).

When the input image contains both the second attribute region and the third attribute region, the input image contains both character components and non-character components, but there is no image region that contains both character components and non-character components, which means that the character components and non-character components are not connected together; as a result, it is highly likely that the characters are not superimposed on a picture, photograph, or the like. Therefore, the binarization unit 205 binarizes only the second attribute region in the input image based on the luminance value of each pixel.

On the other hand, if the input image contains neither the second attribute region nor the third attribute region, it is considered that the input image does not contain any character components, and therefore, the series of steps is terminated without producing a binary image. The binarization unit 205 also terminates the series of steps when a binary image is produced in step S902, S904, or S906.

In the first process, the method of binarizing the input image based on the edge strength of each pixel is not limited to binarizing each pixel based on the edge image. For example, in the first process, the luminance image may be divided into sufficiently small regions (for example, regions of 3×3 pixels), and the pixels in each region may be binarized using a threshold value that is set equal to the average of the luminance values of the pixels in that region. In this case, since the input image can be binarized based on the difference in luminance value between the respective pixels in each region, the character components can be properly separated from the non-character components even when they are adjacent to each other. Therefore, in the first process, the binarization unit 205 binarizes the luminance value of each pixel by setting a binarization threshold value for each specific region, while in the second process, the binarization unit 205 binarizes the luminance value of each pixel by setting a binarization threshold value common to all the pixels within the input image. In this case, in the second process, the binarization can be accomplished faster than in the first process, because there is no need to obtain the binarization threshold value for each specific region.

Alternatively, in the first process, the binarization unit 205 may calculate the edge strength based at least on a chrominance component of each pixel in the input image. For example, the binarization unit 205 calculates the lightness, i.e., the degree of brightness, of each pixel in the input image from the RGB values of that pixel in accordance with the following equation (2), and generates a lightness image by taking the thus calculated lightness as the pixel value of each pixel. Then, an edge image is generated based on the lightness image, and a binary image is produced by binarizing each pixel in the edge image based on whether the pixel value of the pixel is not smaller than a predetermined threshold value.

$$\text{Lightness} = \max(R \text{ value}, G \text{ value}, B \text{ value}) \quad (2)$$

Alternatively, the binarization unit 205 calculates the saturation, i.e., the color purity, of each pixel in the input image from the RGB values of that pixel in accordance with the following equation (3), and generates a saturation image by taking the thus calculated saturation as the pixel value of each pixel. Then, an edge image is generated based on the saturation image, and a binary image is produced by binarizing each pixel in the edge image based on whether the pixel value of the pixel is not smaller than a predetermined threshold value.

$$\text{Saturation} = (\max(R \text{ value}, G \text{ value}, B \text{ value}) - \min(R \text{ value}, G \text{ value}, B \text{ value})) / \max(R \text{ value}, G \text{ value}, B \text{ value}) \quad (3)$$

Alternatively, the binarization unit 205 may normalize the luminance, lightness, and saturation values of each pixel in the input image and may generate an edge image based on an image generated by taking the average or weighted average values of two or all of the normalized values as the pixel values; then, a binary image may be produced by binarizing each pixel in the edge image based on whether the pixel value of the pixel is not smaller than a predetermined threshold value.

Turning back to FIG. 4, the character recognition unit 206 performs character recognition on the binary image produced by the binarization unit 205, and stores the code information of each recognized character in the second storage unit 25 (S407), thus terminating the series of steps. Thereafter, when an instruction for displaying the characters recognized from the input image is issued, for example, by the user operating the input unit 24, the characters corresponding to the code information stored in the second storage unit 25 are displayed on the display unit 23 under the control of the second central processing unit 26. On the other hand, if it is determined that the input image does not contain any character components, the binarization unit 205 does not produce a binary image, and the series of steps is terminated without causing the character recognition unit 206 to perform character recognition.

While the above description has been given by dealing with an example in which the histogram generating unit 203 generates a histogram of the luminance values of the pixels, the present invention is not limited to this particular example. The only requirement is that the histogram generating unit 203 generate a histogram based on the pixel values of the pixels; for example, the histogram may be generated based on the edge strengths of the pixels. In that case, the histogram generating unit 203 generates an edge image by applying edge detection filtering such as Prewitt filtering or Sobel filtering to the luminance, lightness, or saturation of each pixel in each image region produced by dividing the input image by the region dividing unit 202, and generates a histogram of the pixel values of the pixels in the thus generated edge image.

As described earlier, in an ordinary document, the lightness of the characters and the lightness of the background are uniform within their respective areas, but differ greatly from each other so that the viewer can clearly distinguish the characters from the background. As a result, at the boundary between the character and the background, the edge strength has a constant high value, while in other portions, the edge strength has a constant low value. On the other hand, the lightness of a picture, photograph, or the like is not uniform but tends to change gradually. As a result, the edge strength in a picture, photograph, or like portion is lower than the edge strength at the boundary between the character and the background, and the value tends to be distributed over a wide range. Accordingly, in the edge strength histogram, as in the luminance histogram, the character components and the background components tend to be distributed within a narrow range, while the non-character components tend to be distributed over a wide range. Therefore, the component judging unit 204 can judge whether each specific image region contains character components and/or non-character components, by using the edge strength histogram in the same manner as the luminance histogram.

As described in detail above, by performing the sequence of operations in accordance with the flowchart of FIG. 4, the information processing apparatus 20 can perform character recognition at high speed in the case of a document that does not contain any pictures, photographs, or the like, while in the case of a document containing characters along with a picture, photograph, etc., the characters can be recognized by highly accurately separating the characters from the picture, photograph, etc. Thus, it is possible to perform character recognition at high speed while retaining character recognition accuracy.

Figure 10:
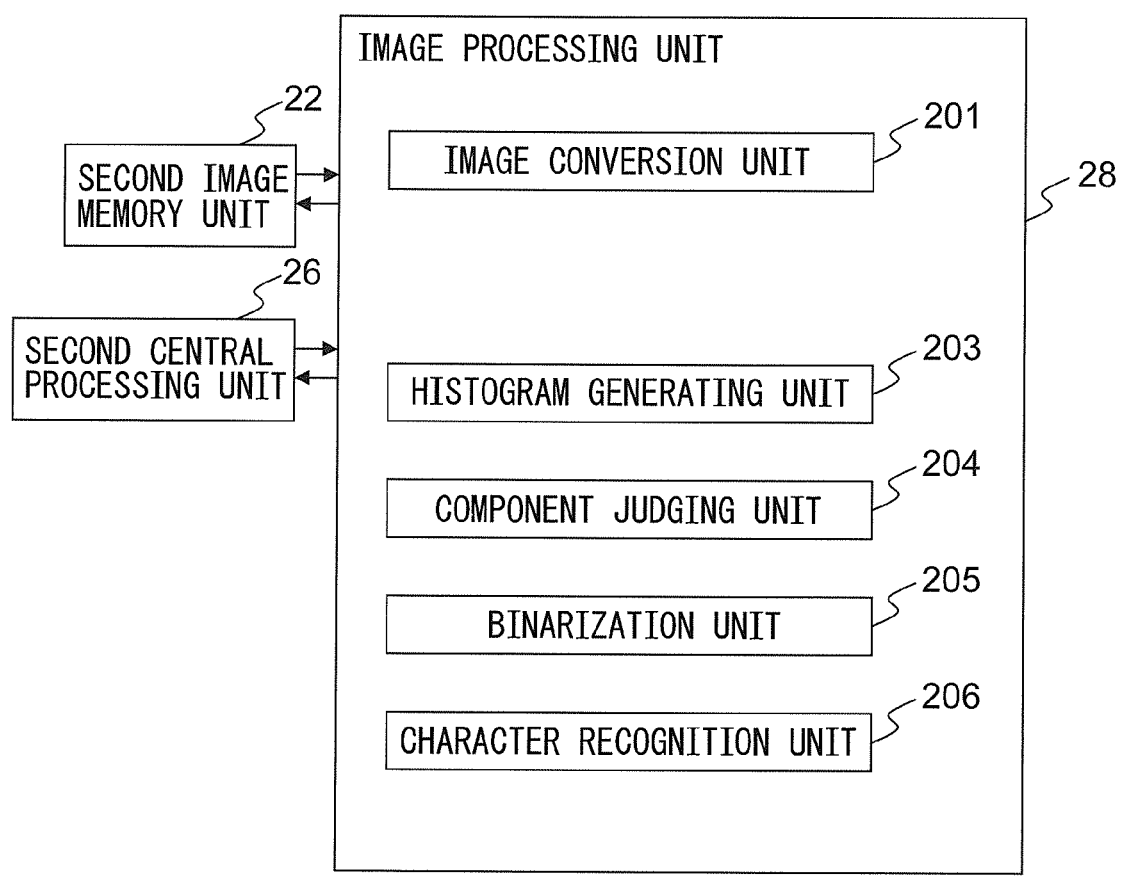
FIG. 10 is a diagram schematically illustrating the configuration of an alternative image processing unit.

FIG. 10 is a diagram schematically illustrating the configuration of an alternative image processing unit. The image processing unit 28 shown in FIG. 10 can be used in place of the image processing unit 27 in the information processing apparatus 20 shown in FIG. 1. The image processing unit 28 shown in FIG. 10 differs from the image processing unit 27 shown in FIG. 2 by the exclusion of the region dividing unit 202.

Figure 11:
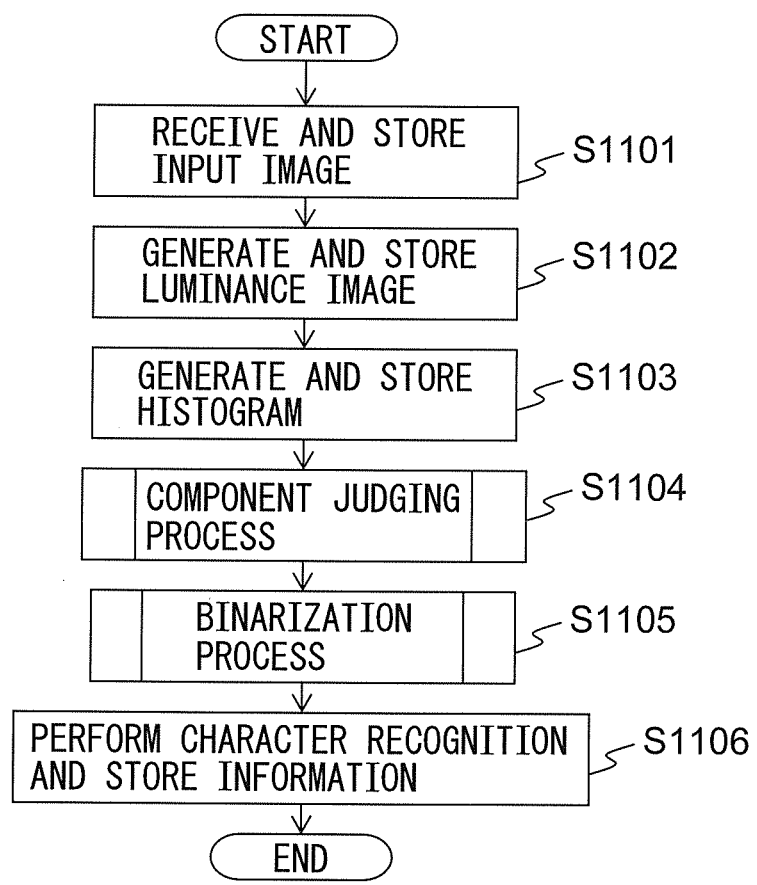
FIG. 11 is a flowchart illustrating another example of the sequence of operations of the character recognition process.

FIG. 11 is a flowchart illustrating one example of the sequence of operations of the character recognition process performed by the information processing apparatus 20 using the image processing unit 28 shown in FIG. 10. The sequence of operations of the character recognition process will be described below with reference to the flowchart of FIG. 11. This flowchart can be executed in place of the flowchart of FIG. 4 by the information processing apparatus 20 shown in FIG. 1. The operation flow described hereinafter is executed primarily by the second central processing unit 26 in collaboration with the various component elements of the information processing apparatus 20 in accordance with the program prestored in the second storage unit 25.

The flowchart of FIG. 11 differs from the flowchart of FIG. 4 in that the information processing apparatus 20 skips the region dividing process of step S403 and proceeds to the subsequent steps to perform processing on the entire image, not on each image region. That is, in step S1103, the histogram generating unit 203 generates a histogram for the entire input image. Then, in step S1104, the component judging unit 204 judges whether the input image contains character components and/or non-character components, based on the histogram generated for the entire input image. Then, in step S1105, if the input image contains both character components and non-character components, the binarization unit 205 produces a binary image by binarizing the input image in accordance with the first process; on the other hand, if the input image contains character components but does not contain any non-character components, the binarization unit 205 produces a binary image by binarizing the input image in accordance with the second process. The steps S1101, S1102, and S1106 shown in FIG. 11 are the same as the corresponding steps S401, S402, and S407 shown in FIG. 4, and therefore, will not be further described herein.

As described in detail above, in the case of the flowchart of FIG. 11 also, the information processing apparatus 20 can perform character recognition at high speed while retaining character recognition accuracy.

Figure 12:
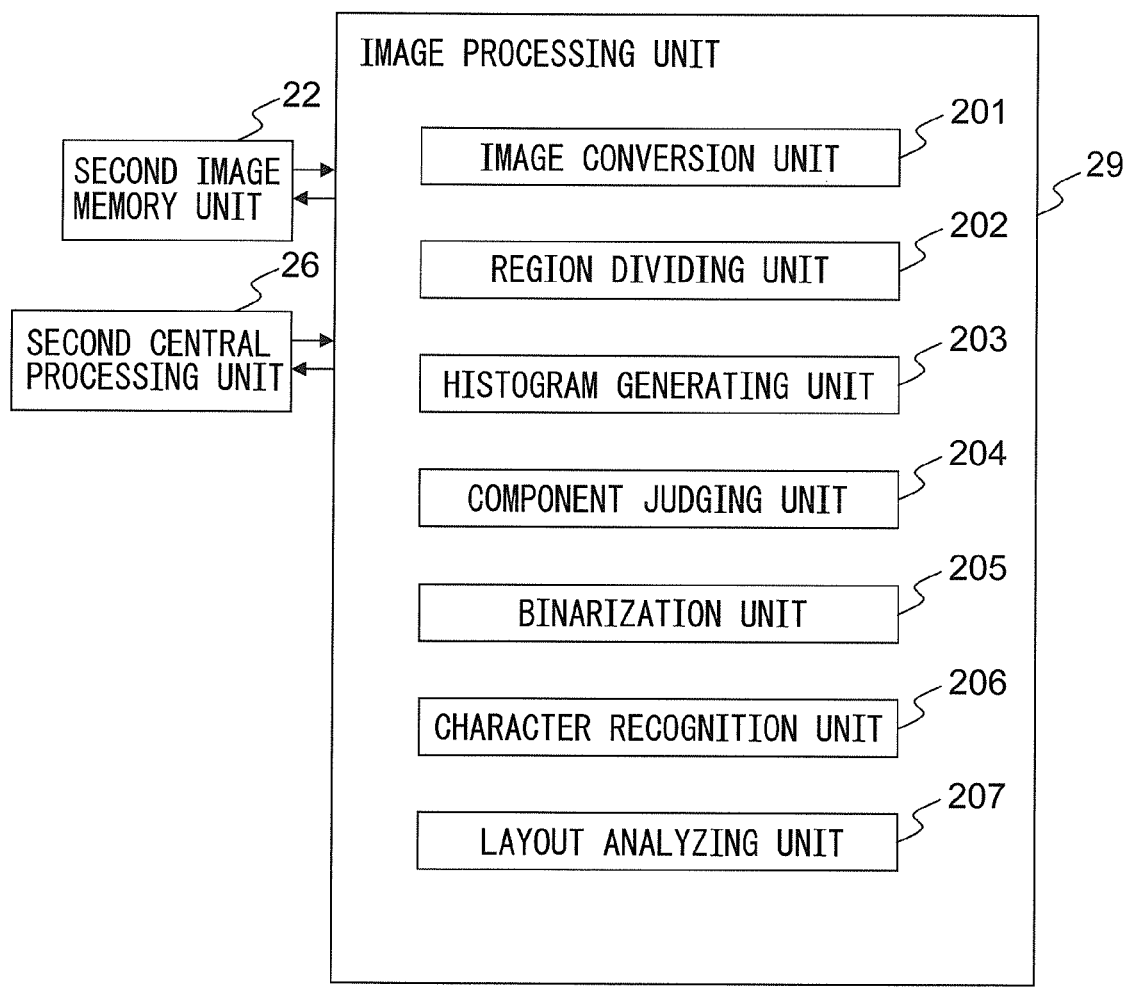
FIG. 12 is a diagram schematically illustrating the configuration of another alternative image processing unit.

FIG. 12 is a diagram schematically illustrating the configuration of another alternative image processing unit. The image processing unit 29 shown in FIG. 12 can be used in place of the image processing unit 27 in the information processing apparatus 20 shown in FIG. 1. The image processing unit 29 shown in FIG. 12 differs from the image processing unit 27 shown in FIG. 2 by the inclusion of a layout analyzing unit 207. In the flowchart of FIG. 9, if the answer in step S905 is Yes, i.e., if the input image does not contain the first attribute region but contains both the second attribute region and the third attribute region, the layout analyzing unit 207 analyzes the layout of the input image in detail.

The layout analyzing unit 207 binarizes the luminance image based on the luminance value of each pixel in such a manner as to separate the image components into the background components and other components, and extracts connected components from the components other than the background components by using a technique such as labeling. Then, the layout analyzing unit 207 obtains a rectangle circumscribing each connected component, and consolidates mutually overlapping circumscribing rectangles as an overlapping rectangle. Further, the layout analyzing unit 207 generates a histogram of the size distribution of such overlapping rectangles, and determines that any extremely large rectangle (whose size falls, for example, within the top 10 percent of the size distribution) is a non-character component, while determining other rectangles as being candidates for character components.

The layout analyzing unit 207 generates a row element by connecting to each character component candidate another candidate that is located within a predetermined distance in the horizontal or vertical direction (for example, within a predetermined multiple of the long side of the circumscribing rectangle) and closest to that character component candidate. Any candidate that has not been connected to another candidate is determined as being a non-character component.

When a row element in the horizontal direction is extracted, the layout analyzing unit 207 generates a column element by connecting to each horizontal row element a horizontal row element that is located within a predetermined distance in the vertical direction (for example, within a predetermined multiple of the vertical length of that horizontal row element) and closest to that horizontal row element. On the other hand, when a row element in the vertical direction is extracted, the layout analyzing unit 207 generates a column element by connecting to each vertical row element a vertical row element that is located within a predetermined distance in the horizontal direction (for example, within a predetermined multiple of the horizontal length of that vertical row element) and closest to that vertical row element. The layout analyzing unit 207 determines that each column element is a character component, while determining that any row element that has not been connected to another row element is a non-character component.

Then, when the input image does not contain the first attribute region but contains both the second attribute region and the third attribute region, the binarization unit 205 binarizes, based on the luminance value of each pixel, only the column elements that have been determined as being character components by the layout analyzing unit 207.

As described in detail above, when the input image contains character components in a region located away from a region containing non-character components, the information processing apparatus 20 can extract the character components with higher accuracy.

Figure 13:
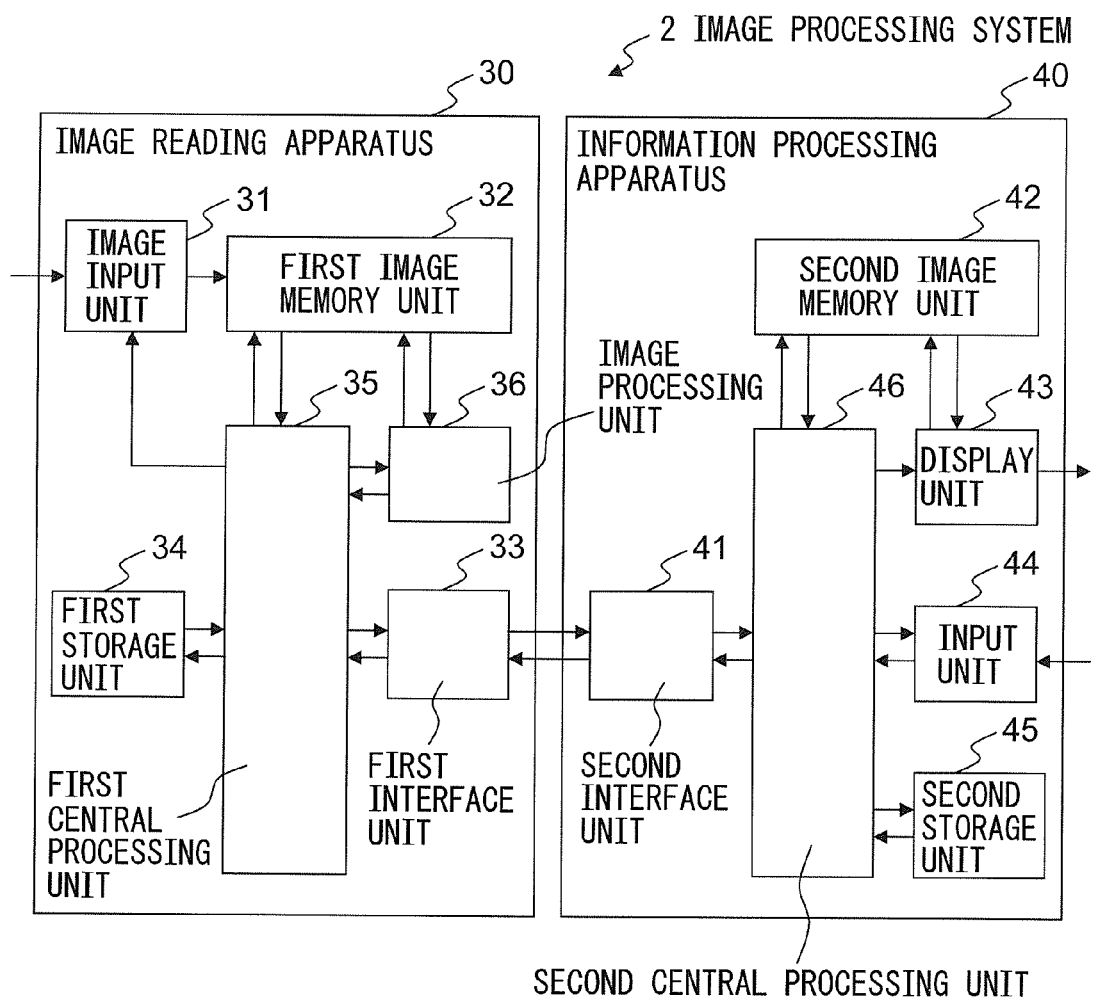
FIG. 13 is a diagram schematically illustrating the configuration of an image processing system according to an alternative embodiment.

FIG. 13 is a diagram schematically illustrating the configuration of an image processing system 2 according to an alternative embodiment. The image processing system 2 shown in FIG. 13 differs from the image processing system 1 shown in FIG. 1 in that the apparatus equipped with the image processing unit is different. More specifically, in the image processing system 2, the image reading apparatus 30, not the information processing apparatus 40, is equipped with the image processing unit 36. The image processing unit 36 is identical in function to the image processing unit 27, 28, or 29 contained in the information processing apparatus 20 of FIG. 1.

The image processing system 2 of FIG. 13 can implement substantially the same processes as those illustrated in FIGS. 3, 4, and 11. The following describes how the image reading process illustrated in the flowchart of FIG. 3 and the character recognition process illustrated in the flowchart of FIG. 4 or 11 are applied here. In the image processing system 2, the process of step S301 and the process of steps S402 to S407 or S1102 to S1106 are executed primarily by the first central processing unit 35 in collaboration with the various component elements of the image reading apparatus 30 in accordance with the program prestored in the first storage unit 34.

In step S301, the image input unit 31 in the image reading apparatus 30 generates an input image by capturing an image of the subject, and stores the input image in the first image memory unit 32. Since the character recognition is performed in the image reading apparatus 30, the steps S302, S401, and S1101 associated with the transmission and reception of the input image are omitted.

The process of steps S402 to S407 or S1102 to S1106 is carried out by the image processing unit 36 in the image reading apparatus 30. The sequence of operations in this process is the same as that carried out by the image processing unit 27, 28, or 29 in the information processing apparatus 20 earlier described in connection with the image processing system 1. The character recognition unit 206 in the image reading apparatus 30 transmits the code information of each recognized character to the information processing apparatus 40 via the first interface unit 33. On the other hand, the second central processing unit 46 in the information processing apparatus 40 receives the code information of each character and stores it in the second storage unit 45.

In this way, when the image reading apparatus 30 is equipped with the image processing unit 36 and performs the character recognition process, the same effect can be achieved as when the information processing apparatus is equipped with the image processing unit and performs the character recognition process.

While the preferred embodiments thereof has been described, it will be appreciated that the present invention is not limited to the above specific embodiments. For example, the division of functionality between the image reading apparatus and the information processing apparatus is not limited to the example of the image processing system illustrated in FIG. 1 or 13, but the functional units, including those of the image processing unit, may be interchanged as desired between the image reading apparatus and the information processing apparatus. Alternatively, the image reading apparatus and the information processing apparatus may be combined into one apparatus.

Further, in the image processing system 1 shown in FIG. 1, when connecting the image reading apparatus 10 to the information processing apparatus 20 via a wired or wireless network, a plurality of information processing apparatuses 20 may be installed in a distributed manner over the network so that the image processing service can be provided in the form of cloud computing, and the processing such as the region division, binarization, etc., may be performed with the information processing apparatuses 20 collaborating with each other. In this way, the image processing system 1 can efficiently perform the region division and binarization operations on input images acquired by a plurality of image reading apparatuses 10.

Likewise, in the image processing system 2 of FIG. 13 also, the first interface unit 33 of the image reading apparatus 30 and the second interface unit 41 of the information processing apparatus 40 may be interconnected via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   a histogram generator for generating a histogram based on a pixel value of each pixel in an input image;
   a component judging unit for judging whether said input image contains a character component and whether said input image contains a non-character component which is other than said character component and a background component, based on said histogram;
   a binarization unit for producing a binary image in accordance with a first process that binarizes said input image based on edge strength of each pixel, when said input image contains both said character component and said non-character component, and for producing a binary image in accordance with a second process that binarizes said input image based on a luminance value of each pixel, when said input image contains said character component but does not contain said non-character component; and
   a character recognition unit for performing character recognition on said binary image.

2. The image processing apparatus according to claim 1, further comprising a region dividing unit for dividing said input image into a plurality of image regions separated from each other by a region formed by connecting pixels each having a luminance value which is a predetermined width, and wherein
   said histogram generator generates said histogram for each of said image regions,
   said component judging unit judges each of said image regions to determine whether said image region contains said character component and whether said image region contains said non-character component, and
   when said input image contains both said character component and said non-character component and when at least one of said image regions contains both said character component and said non-character component, said binarization unit generates a binary image in accordance with said first process, and when none of said image regions contain both said character component and said non-character component, said binarization unit generates a binary image, not in accordance with said first process, by binarizing only image region containing said character component based on the luminance value of each pixel.

3. The image processing apparatus according to claim 1, wherein in said first process, said binarization unit calculates said edge strength based at least on a chrominance component of each pixel.

4. The image processing apparatus according to claim 1, wherein in said first process, said binarization unit binarizes the luminance value of each pixel by setting a binarization threshold value for each specific region, and in said second process, said binarization unit binarizes the luminance value of each pixel by setting a binarization threshold value common to all pixels.

5. The image processing unit according to claim 1, wherein said histogram generator generates said histogram based on the edge strength of each pixel.

6. A character recognition method comprising:
   generating a histogram based on a pixel value of each pixel in an input image;
   judging whether said input image contains a character component and whether said input image contains a non-character component which is other than said character component and a background component, based on said histogram;
   producing a binary image in accordance with a first process that binarizes said input image based on edge strength of each pixel when said input image contains both said character component and said non-character component, and producing a binary image in accordance with a second process that binarizes said input image based on a luminance value of each pixel when said input image contains said character component but does not contain said non-character component; and
   performing, using a computer, character recognition on said binary image.

7. A computer-readable, non-transitory medium storing a computer program, wherein said computer program causes a computer to execute a process, the process comprising:
   generating a histogram based on a pixel value of each pixel in an input image;
   judging whether said input image contains a character component and whether said input image contains a non-character component which is other than said character component and a background component, based on said histogram;
   producing a binary image in accordance with a first process that binarizes said input image based on edge strength of each pixel when said input image contains both said character component and said non-character component, and producing a binary image in accordance with a second process that binarizes said input image based on a luminance value of each pixel when said input image contains said character component but does not contain said non-character component; and
   performing character recognition on said binary image.

* * * * *